April 26, 1960   E. F. KIERNAN   2,934,286
RADAR CONTROLLED MISSILE
Filed June 3, 1953   3 Sheets-Sheet 1

INVENTOR.
EARL F. KIERNAN
BY George Sipkin
George E. Pearson
ATTORNEYS

April 26, 1960   E. F. KIERNAN   2,934,286
RADAR CONTROLLED MISSILE
Filed June 3, 1953   3 Sheets-Sheet 2

INVENTOR.
EARL F. KIERNAN
BY George Sipkin
George E. Pearson
ATTORNEYS

United States Patent Office 2,934,286
Patented Apr. 26, 1960

2,934,286

RADAR CONTROLLED MISSILE

Earl F. Kiernan, San Diego, Calif.

Application June 3, 1953, Serial No. 359,671

11 Claims. (Cl. 244—14)

(Granted under Title 35, U.S. Code (1952), sec. 266)

The invention described herein may be manufactured and used by or for the Government of the United States of America for governmental purposes without the payment of any royalties thereon or therefor.

This invention relates to a radar remote control system for a self-propelled missile.

It is an object of this invention to provide continuous control, guidance and alignment monitoring of a missile of either aerial or surface type.

It is a further object to provide a control system wherein the missile may be readily identified at the control source.

Still a further object of this invention is to provide a control system for a missile wherein the missile is controlled by a radar beam.

A still further object of the invention is to provide a missile launching and control system wherein the antenna of the control system and the catapult for launching the missile are constantly in synchronization.

Still another object of the invention is to provide a remote control system for a missile wherein the missile has a transmitting means therein for sending out recognition signals in response to signals from the control point to provide ready identification of the missile at the control point.

A still further object is to provide a guided missile having a sharply responsive directional antenna array thereon.

Other objects and many of the attendant advantages of this invention will be readily appreciated as the same becomes better understood by reference to the following detailed description when considered in connection with the accompanying drawings, wherein.

Figure 1:
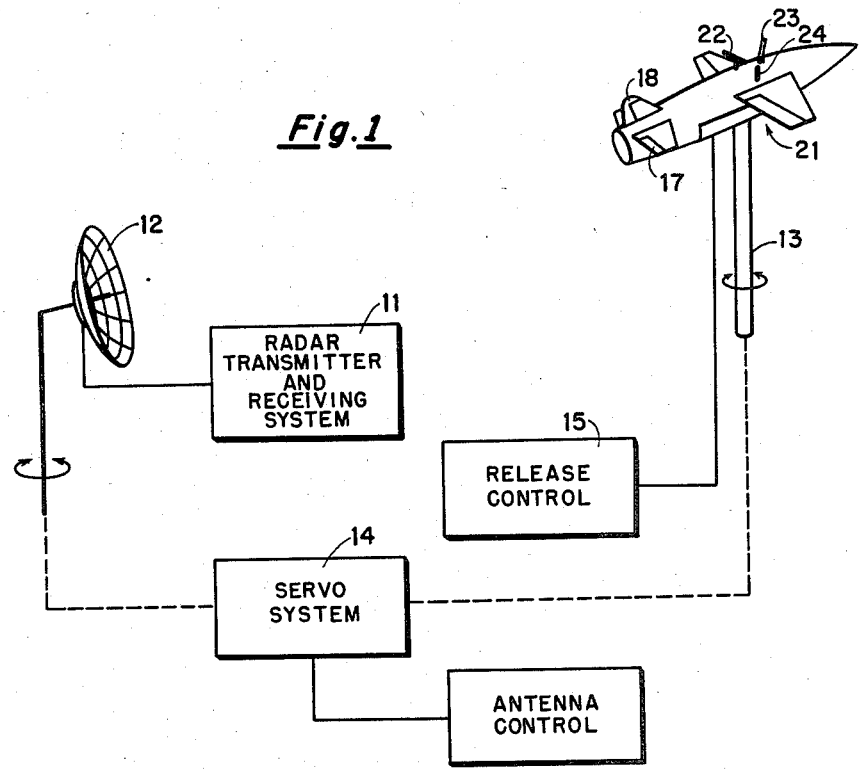
Fig. 1 is a schematic illustration of an embodiment of the invention.
Figure 2:
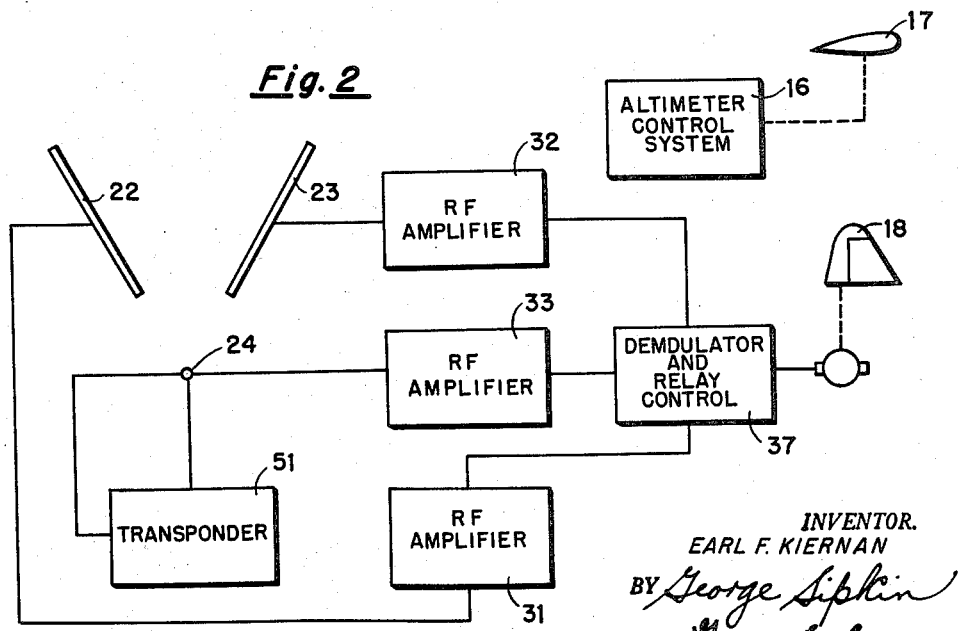
Fig. 2 is a schematic partially in block diagram of the steering control system.

In the operational arrangement of the system a radar transmitting and receiving system 11 has its rotatable parabolic antenna 12 synchronized with a rotatable catapult launching device 13, as by a servo system 14. The heading of the catapult launching device, or in other words the heading of the missile which is launched therefrom, thus is maintained in alignment with the center of the radar beam. The catapult and the radar antenna rotate in synchronism while the radar is used to search for targets. As soon as the target is located, a release control 15 is manually operated to actuate a suitable launching mechanism (not shown), and the missile then proceeds upon its way under a suitable source of power such as jet, rocket, or propeller (not shown), which is also actuated by the release control 15. Since the precise launching mechanism and release control do not form a part of my invention, and since suitable such mechanisms and controls are well known to those skilled in the art, the same will not be further described herein. A sensitive altimeter control system 16 may be arranged in the missile to control the elevators 17 to hold the missile at some pre-set altitude, say ten feet above the surface, so as to contact the target at a suitable point. Such altimeter systems are well known to those skilled in the art and will not be further described herein.

The missile 21 has mounted thereon a system of three antennas, 22, 23 and 24, which are connected through suitable arrangements, hereinafter described, to control the rudder 18 of the missile in response to signals received from the radar system 11, 12. The operator at the radar controls maintains alignment of the target and the missile by accurate centering of the target "echo" signals on his indicator, this being accomplished by adjustment of a handwheel in the antenna control. In searching for a target, the antenna is rotated at a constant rate, as hereinbefore set forth. When a target is located and tracking of the target is desired, the motor drive for the antenna is disconnected and the antenna is rotated by use of the handwheel. "Recognition" signals from the missile, to be hereinafter described further, enable the operator to check its position as it proceeds toward the target. The radar transmitting and receiving system 11, servo system 14 and antenna control therefor, and parabolic antenna 12 may be of a type which is commonly used in the art, and will not be further described herein. It suffices to state that the transmitted control signal from antenna 12 is a conventional "beamed" radar signal and is therefore of such a nature that the directional antenna array comprising antennas 22, 23, and 24 produce balanced signal outputs when the array is properly oriented, as hereinafter described, on the axis of the beam and produces unbalanced signal outputs when the array moves off the axis of the beam or when the beam is moved from a position of orientation of the array on the axis of the beam.

The antenna system on the missile 21 is comprised of three antennas, 22, 23 and 24. Antennas 22 and 23 are half-wave doublets, normally horizontal, mounted with their centers one-half wavelength apart at the working frequency and so oriented as to have their axes pass through the center of a third non-directional antenna, such as a vertical one-quarter wavelength antenna 24, also located one-half wavelength from the centers of antennas 22 and 23. Antennas 22, 23 and 24 are connected through R-F amplifiers 31, 32 and 33, respectively to the primary coils of transformers 34, 35 and 36, respectively, of a differential demodulator and relay control, generally designated 37.

Antenna 24 is also connected to and acts as the receiving and transmitting antenna for a recognition transponder 51, which is triggered and gives off triggered recognition signals in response to signals received by antenna 24 from the radar transmitter 11 at the remote control point. This provides a great advantage in enabling the operator to at all times distinguish the target from the missile and to check the position of the missile as well as the target as the missile proceeds on its way. Due to the configuration and arrangement of the antennas 22, 23 and 24, as described supra, no recognition signals from 24 are induced through 22 or 23.

It will thus be seen that antenna 24 serves the dual purpose of receiving signals from the radar antenna control system and application thereof to the demodulator in the missile, and also of applying the radar pulses to transponder 51 which in turn transmits through antenna 24 a recognition signal which may be picked up by the radar control system 11, 12 at the remote control base.

In the differential demodulator and relay control 37 the secondary of the transformer 36 to which the signal from the antenna 24 is supplied is common to the cathode circuit of both the tubes 38 and 39 which control the right and left rudder control relays, and the secondary coils of the transformers 34 and 35, to which are applied the signals from the antennas 22 and 23, respectively, are in the grid circuits of the tubes 38 and 39, respectively, for control of the right and left rudder relays 40 and 41. The relays 40 and 41 are in the plate circuits of tubes 38 and 39 and thus are operated only when either of these tubes is conducting in sufficient amount to energize its respective relay. The tubes 38 and 39 may be of either the vacuum type or the thyratron type. It will be seen that the signal received by antenna 24 provides both a phase and amplitude reference with respect to the signals received by antennas 22 and 23. When the signals applied to the coils of transformers 34 and 35, by antennas 22 and 23, respectively, are "balanced" (i.e., the instantaneous absolute amplitudes of the signals are equal, as will be described infra) with respect to the signal applied to the coils of transformer 36 neither of the relays 40 or 41 is operated. However, when the antennas 22 and 23 are shifted with respect to antenna 24 to a position such that the incoming signals to antennas 22 and 23 are in a state of "unbalance" the signals on the grids 42 and 43 change so as to cause an unbalance in the plate currents of the tubes 38 and 39 until one of the relays 40 and 41 is energized. The relay 40 or 41 that is energized is dependent upon whether the missile is off-beam to the right or to the left, this being reflected in the signals received by the antennas 21 and 22 and applied to the two grids 42 and 43. The relays 40 and 41 may actuate a reversible motor 48 or other suitable mechanism to move the rudder right or left, as the case may be, through cable 44. Alternatively, solenoids (not shown) or other suitable means might be actuated to move the rudder. The rudder 18 of the missile 21 is thus moved in the direction corresponding to this particular relay and will thus steer the missile 21 back toward the center of the radar beam. A state of signal "balance" will occur when the missile is again on course and the particular rudder relay which was actuated will then be de-actuated, permitting the rudder to return to its center position under the influence of centering springs 45 and 46.

Figure 4:
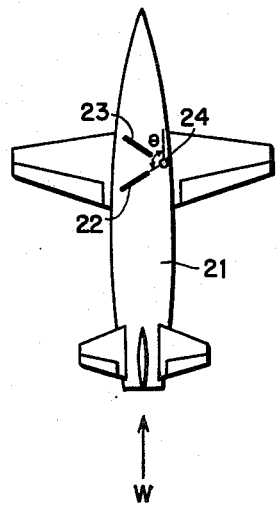
Fig. 4 is a schematic illustration of an antenna array arrangement on a missile.
Figure 5:
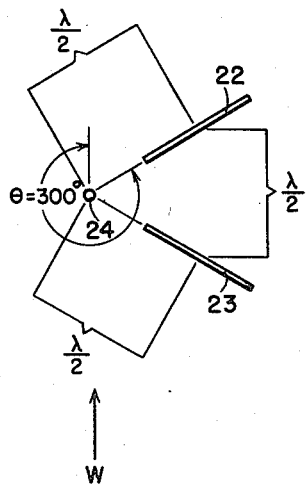
Fig. 5 is a schematic illustration of a second antenna array arrangement.
Figure 3:
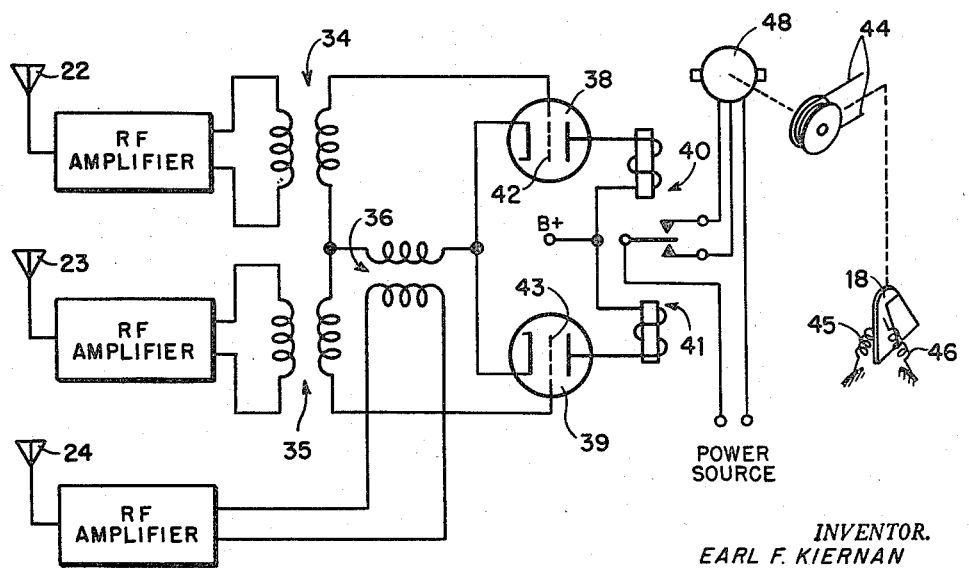
Fig. 3 is a further schematic diagram of the rudder control system in more detail.

In order to further describe the functioning of the antenna system 22, 23 and 24, it will be assumed that a signal is approaching the antenna system in the direction of arrow W, as shown in Figs. 4 and 5. The following factors will be considered as the antenna system rotates about antenna 24 as a center: (1) the directional characteristics of antennas 22 and 23, (2) the phase relations of the signals received by antennas 22 and 23, and (3) the phase relations of the signals received by antennas 22 and 23 relative to the signal received by 24.

Figure 6:
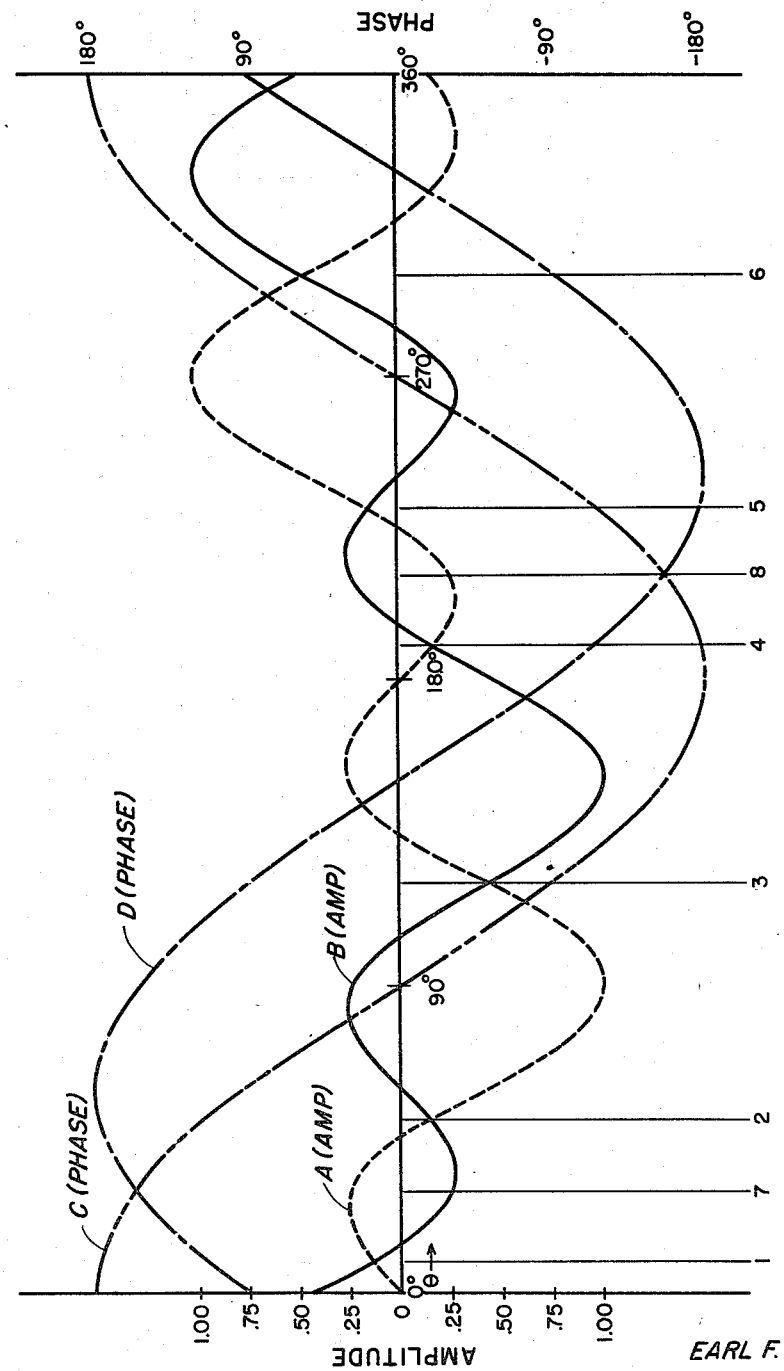
Fig. 6 is a graph of the antenna characteristics.

Assuming equal signals delivered to antennas 22 and 24, the directional characteristic of antenna 22 may be said to be $$A = E \text{ sine } \theta$$

where $\theta$ is the angle between the axis of antenna 22 and a perpendicular (indicated by directional line W) to the wave front. As $\theta$ changes from zero to 90 geometrical degrees, the signal applied to antenna 22 will change from 180 to zero electrical degrees phase with the signal applied to antenna 24 varying as cosine $2\theta$. The combined result may be represented as:

$$A = E \text{ sine } \theta \text{ cosine } 2\theta$$

which represents the resultant potential change in the grid circuit including the secondary coil of transformer 34. A similar equation represents the resultant of the combination of the signals received by antennas 23 and 24. These two equations have been portrayed in Fig. 6 together with graphs of their respective phase relationship to the signal received by antenna 24. In this graphical plot the curves A and B represent respectively the amplitudes of the combined signals received by antennas 22—24 and 23—24 over a range of 0–360 geometrical degrees. Curves C and D represent the phase relation of the combined resultant signals received by antennas 22—24 and 23—24, respectively, as compared to the phase of the signal received by antenna 24, over a range of 0–360 geometrical degrees. Inspection of curves A (amplitude) and B (amplitude) discloses six points marked 1 to 6 at which the amplitudes of A and B will be equal and of like sign; also two points 7 and 8 at which the amplitudes will be equal but of opposite sign. Further inspection will show that of these eight points there are four (e.g. 7, 8, 3 and 6) at which the amplitudes are equal with equal or opposite phase angles with respect to the signal applied to antenna 24. Any one of these four points could be used as the "balanced" on-course configuration for the missile antenna system. However, when either points 7 or 8 are used as the "balanced" positions, one coil of either transformer 34 or 35 would have to be reversed in polarity as compared to its polarization when used with the configuration for points 3 or 6. Comparison of points 7 and 8 with points 3 and 6 indicates that the latter positions are preferable configurations for the following reasons: (a) the amplitudes are greater, (b) the slope of the amplitude graphs are greater, and (c) the slopes of the phase graphs are greater and changing so as to increase "unbalance" if the array rotates in either direction from the "balanced" position. These characteristics all tend to make the differential relay action more sensitive to deviations of the antenna array from the balanced position.

In Fig. 4 there is schematically represented a missile having an antenna array with the "balanced" on course position of the antenna corresponding to an angle of $\theta = 120$ degrees. This "balanced" position of the antenna array as pointed out above is one of the two more desirable such positions, and provides good control of the missile. Fig. 5 illustrates a second possible position of the antenna array which might be selected as the balanced position, wherein $\theta = 300$ degrees.

The foregoing discussion has to do with the automatic maintenance of alignment between the missile heading and the center of the radar beam. Considering next the action when the beam is moved to either side of a given position, the antenna axis of either antenna 22 or 23 toward which the beam is rotated will make a smaller angle $\theta$ perpendicular to the wave front. The resulting unbalance and the amplification of the signals to the demodulator will cause a "ruddering" action corresponding to a change in missile heading opposite to the direction in which the radar beam was moved. Hence the missile will follow the movement of the beam, providing such beam movement does not exceed in effective velocity the response ability of the missile control system.

Obviously many modifications and variations of the present invention are possible in the light of the above teachings. It is therefore to be understood that within the scope of the appended claims the invention may be practiced otherwise than as specifically described.

What is claimed is:

1. A missile launching and control system comprising signal generating means, rotatably mounted unidirectional antenna means operably connected to said signal generating means for transmitting a beamed radar signal, rotatably mounted catapult launching means for a missile, said launching means being operably connected to said antenna means for synchronous movement therewith, a missile releasably mounted on said launching means, means for releasing the missile when a target is intercepted by said beam, means for tracking said target with said beam, a directional antenna array mounted on said missile for producing balanced signal outputs when the array is in a position of predetermined orientation on the axis of said beam and producing unbalanced signal outputs when the array and beam deviate from said predetermined orientation, said array comprising a plurality of antennas having predetermined direction, amplitude, and phase characteristics relative to each other and relative to said beam, said missile having a rudder and rudder control means, said rudder control means being operably connected to said antenna array for causing movements of said rudder sufficient to guide the missile onto said beam in response to said unbalanced signal outputs received from said antenna array.

2. A system as defined in claim 1 wherein said antenna array is comprised of a nondirectional antenna, and a pair of half-wave doublets, each antenna being mounted a half wavelength from the other.

3. A system as defined in claim 2 wherein there is further provided a combination receiving, triggering and recognition signal generating means in said missile, said last named means being operably connected to said nondirectional antenna, whereby recognition signals are generated and transmitted by said nondirectional antenna in response to signals received from said first named signal generating means.

4. A system as defined in claim 3 wherein the axis of each of said half-wave doublets lies in a plane perpendicular to the axis of said nondirectional antenna whereby the signals emitted by said nondirectional antenna are not picked up by said doublets.

5. A controllable missile having a rudder and rudder control means, and a directional antenna array mounted on said missile for receiving a signal from a remote control source, said antenna array comprising a non-directional antenna and a pair of half-wave doublet antennas, each of said antennas being mounted a half wavelength from the other and operably connected to said rudder control means.

6. A missile as defined in claim 5 wherein an angle of 120 degrees is formed between a line passing through the axial length of said missile and a line passing through said non-directional antenna and one of said half-wave doublet antennas.

7. A missile as defined in claim 5 wherein an angle of 300 degrees is formed between a line passing through the axial length of said missile and a line passing through said non-directional antenna and one of said half-wave doublets.

8. A controllable missile having a rudder and rudder control means, and a directional antenna array mounted on said missile for receiving control signals, said array comprising a non-directional antenna and a pair of half-wave doublet antennas disposed in a plane at right angles to the axis of said nondirectional antenna, each of said antennas being mounted a half wave-length from the other, said rudder control means comprising a differential demodulator operably connected to said antenna array, and translating means operably connected to said demodulator, said translating means being operably connected to said rudder for control of said rudder.

9. An antenna array for a guided missile controllable by a beamed radar signal comprising first, second, and third antennas so oriented on the missile that the combined signal output of the first and second antennas and the combined signal output of the first and third antennas in response to said beamed signal are each represented by the expression $A = E \sin \theta \cosine 2\theta$ where $\theta$ is the angle of rotation of the second and third antennas about the axis of the first antenna and the signal output of the first antenna varies as $\cosine 2\theta$.

10. An antenna array for a guided missile controllable by a beamed radar signal comprising first, second, and third antennas, said second and third antennas being angularly spaced relative to each other and mounted on said missile in a plane perpendicular to the axis of the first antenna, and said second and third antennas being half-wave doublets spaced at the centers thereof from said axis of the first antenna by one half the wavelength of said signal at the working frequency thereof.

11. An antenna array as in claim 10 having said second and third antennas separated at the centers thereof by one half the wavelength of said signal.

References Cited in the file of this patent

UNITED STATES PATENTS

| Number | Name | Date |
|---|---|---|
| 2,109,475 | Fanning | Mar. 1, 1938 |
| 2,165,800 | Koch | July 11, 1939 |
| 2,414,103 | Hunter | Jan. 14, 1947 |
| 2,432,858 | Brown | Dec. 16, 1947 |
| 2,594,305 | Haller | Apr. 29, 1952 |
| 2,608,683 | Blewett | Aug. 26, 1952 |
| 2,745,095 | Stoddard | May 8, 1956 |

FOREIGN PATENTS

| Number | Country | Date |
|---|---|---|
| 546,153 | Germany | Mar. 21, 1932 |